(12) United States Patent
Dalal et al.

(10) Patent No.: US 9,092,375 B1
(45) Date of Patent: Jul. 28, 2015

(54) CLOUD-BASED INSTANT VOLUME RESTORE WITH DATA SOURCE SWITCHOVER FEATURE

(75) Inventors: Chirag Dalal, Pune (IN); Mehtab Ali Syed, Pune (IN); Makarand Gawade, Pune (IN)

(73) Assignee: Symantec Corporation, Mountain View, CA (US)

( * ) Notice: Subject to any disclaimer, the term of this patent is extended or adjusted under 35 U.S.C. 154(b) by 763 days.

(21) Appl. No.: 13/279,634

(22) Filed: Oct. 24, 2011

(51) Int. Cl.
*G06F 12/00* (2006.01)
*G06F 11/14* (2006.01)

(52) U.S. Cl.
CPC ........ *G06F 11/1451* (2013.01); *G06F 11/1469* (2013.01); *G06F 2201/84* (2013.01)

(58) Field of Classification Search
CPC ............ G06F 11/1451; G06F 11/1469; G06F 2201/84
USPC ......................................................... 711/162
See application file for complete search history.

(56) References Cited

U.S. PATENT DOCUMENTS

| | | | |
|---|---|---|---|
| 8,045,510 B2 | 10/2011 | Yuan et al. | |
| 8,214,685 B2 | 7/2012 | Rosychuk | |
| 8,260,913 B2 | 9/2012 | Knapp et al. | |
| 8,261,126 B2 | 9/2012 | Sosnosky et al. | |
| 8,285,681 B2 | 10/2012 | Prahlad et al. | |
| 8,315,977 B2 | 11/2012 | Anand et al. | |
| 8,341,363 B2 | 12/2012 | Chou et al. | |
| 8,347,184 B2 | 1/2013 | Liu | |
| 8,601,214 B1 * | 12/2013 | Chakalian et al. | 711/118 |
| 2008/0126847 A1 * | 5/2008 | Koarashi | 714/6 |
| 2009/0292709 A1 * | 11/2009 | Tsinman et al. | 707/10 |
| 2009/0327445 A1 * | 12/2009 | van Rietschote et al. | 709/213 |
| 2010/0217948 A1 * | 8/2010 | Mason et al. | 711/171 |
| 2011/0055501 A1 * | 3/2011 | Wake | 711/162 |
| 2011/0167221 A1 * | 7/2011 | Pangal et al. | 711/117 |
| 2012/0089781 A1 * | 4/2012 | Ranade et al. | 711/118 |

* cited by examiner

*Primary Examiner* — Aracelis Ruiz
(74) *Attorney, Agent, or Firm* — Meyertons, Hood, Kivlin, Kowert & Goetzel, P.C.

(57) ABSTRACT

Various embodiments of a system and method for restoring a data volume to a client computer system from a backup image are disclosed. A backup image at a remote backup server computer system may first be selected as a data source for the volume. The volume may be "instantly restored" on the client computer system without first requiring all of the data in the remote backup image to be transmitted from the backup server computer system. Instead, a lazy restore technique may be used where volume data is retrieved from the backup image on the backup server computer system as needed. Further embodiments of the system and method may enable the data source for the volume to be switched from the remote backup server computer system to a local data source at a later time.

14 Claims, 6 Drawing Sheets

CLOUD-BASED INSTANT VOLUME RESTORE WITH DATA SOURCE SWITCHOVER FEATURE

BACKGROUND OF THE INVENTION

1. Field of the Invention

This invention relates to the field of computer software, and more particularly, to software executable to restore a data volume from a backup image.

2. Description of the Related Art

Computer systems generally store files in file system volumes. If a storage device on which a volume is stored fails then the volume may be lost. It is common practice for individuals and organizations to use backup software to protect files that reside in file system volumes. For example, a client computer system may be coupled to a backup server computer system through a network. Backup software may execute to transmit copies of files in a volume on the client computer system to the backup server computer system, where they may be stored in a backup image. If the volume later fails on the client computer system then the backup software may communicate with the backup server computer system to request that the backup image be transmitted from the backup server computer system back to the client computer system, where it can be used to restore the failed volume.

Unfortunately, the restoration process may be slow and inefficient. For example, because many clients typically share a small number of backup servers, the restoration process may be slowed by network latencies. Restoration may be further slowed if a slow or busy network connects the backup server to its clients. Even if the network speed is fast it may still take a significant amount of time to transmit the backup image back to the client computer system if the backup image contains a large amount of data. During the time the backup image is being transmitted back to the client computer system, the volume may not be available to use. This may cause users to lose valuable time while waiting for the volume to be restored.

SUMMARY

Various embodiments of a computer-accessible storage medium, system, and method for restoring a volume to a host computer system are disclosed. According to one embodiment of the method, a first copy of a backup image stored on a remote server may be selected as a data source for the volume on the host computer system. After selecting the first copy of the backup image as the data source for the volume, a first read request requesting a first set of data blocks from the volume may be received. In response to determining that the first set of data blocks is not stored in the volume, the first set of data blocks may be retrieved from the first copy of the backup image at the remote server, and may be stored in the volume on the host computer system. After the first set of data blocks have been retrieved, the data source for the volume may be changed from the first copy of the backup image at the remote server to a second copy of the backup image stored on a local storage device coupled to the host computer system. After the data source for the volume has been changed to the second copy of the backup image, a second read request requesting a second set of data blocks from the volume may be received. In response to determining that the second set of data blocks is not stored in the volume, the second set of data blocks may be retrieved from the second copy of the backup image on the local storage device, and may be stored in the volume on the host computer system.

In some embodiments the first copy of the backup image may be selected as the data source for the volume in response to detecting a failure of the volume.

Further embodiments of the method may comprise placing an order for the local storage device on which the second copy of the backup image is stored with a vendor who manages the remote server.

Further embodiments of the method may comprise returning the first set of data blocks in response to the first read request, and returning the second set of data blocks in response to the second read request.

In some embodiments the second read request may also request a third set of data blocks from the volume. The method may further comprise retrieving the third set of data blocks from the volume in response to determining that the third set of data blocks is already stored in the volume. In some embodiments the third set of data blocks may have been previously retrieved from the first copy of the backup image at the remote server while the first copy of the backup image was selected as the data source for the volume. In other embodiments the third set of data blocks may have been previously retrieved from the second copy of the backup image on the local storage device while the second copy of the backup image was selected as the data source for the volume. In other embodiments the third set of data blocks may include a first one or more data blocks that were previously retrieved from the first copy of the backup image at the remote server while the first copy of the backup image was selected as the data source for the volume, and a second one or more data blocks that were previously retrieved from the second copy of the backup image on the local storage device while the second copy of the backup image was selected as the data source for the volume.

Further embodiments of the method may comprise receiving a third read request requesting one or more data blocks from the volume after receiving the first read request and before changing the data source for the volume to the second copy of the backup image. The one or more data blocks may include one or more of the first set of data blocks requested by the first read request and one or more additional data blocks. The one or more of the first set of data blocks may be retrieved from the volume in response to the third read request. In response to determining that the one or more additional data blocks are not stored in the volume, the one or more additional data blocks may be retrieved from the first copy of the backup image at the remote server, and may be stored in the volume.

In some embodiments the data source for the volume may be changed to the second copy of the backup image while the volume remains mounted on the host computer system.

Further embodiments of the method may comprise performing a restore operation to retrieve data blocks that have not yet been requested by a read request from the first copy of the backup image at the remote server and store them in the volume. The restore operation may be performed while the first copy of the backup image is selected as the data source for the volume. In further embodiments, the restore operation may be halted, and then may be resumed after the data source for the volume has been changed to the second copy of the backup image. The resumed restore operation may continue retrieving data blocks that have not yet been requested by a read request from the second copy of the backup image on the local storage device and store them in the volume.

In some embodiments the method may operate to begin performing the restore operation before the first read request is received, and may pause the restore operation in response to receiving the first read request. This may enable the first read request to take priority over the restore operation.

Further embodiments of the method may comprise displaying a graphical user interface enabling a user to select the data source for the volume, and changing the data source for the local volume from the first copy of the backup image to the second copy of the backup image in response to user input selecting the data source.

The computer-accessible storage medium may store program instructions executable by one or more processors to select a first copy of a backup image stored on a remote server as a data source for a volume on a host computer system. The program instructions may be further executable by the one or more processors to receive a first read request requesting a first set of data blocks from the volume after selecting the first copy of the backup image as the data source for the volume. In response to determining that the first set of data blocks is not stored in the volume, the program instructions may be further executable by the one or more processors to retrieve the first set of data blocks from the first copy of the backup image at the remote server, and store the first set of data blocks in the volume. After retrieving the first set of data blocks, the program instructions may be further executable by the one or more processors to change the data source for the volume from the first copy of the backup image at the remote server to a second copy of the backup image stored on a local storage device coupled to the host computer system. After changing the data source for the volume to the second copy of the backup image, the program instructions may be further executable by the one or more processors to receive a second read request requesting a second set of data blocks from the volume. In response to determining that the second set of data blocks is not stored in the volume, the program instructions may be further executable by the one or more processors to retrieve the second set of data blocks from the second copy of the backup image on the local storage device, and store the second set of data blocks in the volume.

A host computer system may comprise one or more processors and memory storing program instructions. The program instructions may be executable by the one or more processors to select a first copy of a backup image stored on a remote server as a data source for a volume on the host computer system. The program instructions may be further executable by the one or more processors to receive a first read request requesting a first set of data blocks from the volume after selecting the first copy of the backup image as the data source for the volume. In response to determining that the first set of data blocks is not stored in the volume, the program instructions may be further executable by the one or more processors to retrieve the first set of data blocks from the first copy of the backup image at the remote server, and store the first set of data blocks in the volume. After retrieving the first set of data blocks, the program instructions may be further executable by the one or more processors to change the data source for the volume from the first copy of the backup image at the remote server to a second copy of the backup image stored on a local storage device coupled to the host computer system. After changing the data source for the volume to the second copy of the backup image, the program instructions may be further executable by the one or more processors to receive a second read request requesting a second set of data blocks from the volume. In response to determining that the second set of data blocks is not stored in the volume, the program instructions may be further executable by the one or more processors to retrieve the second set of data blocks from the second copy of the backup image on the local storage device, and store the second set of data blocks in the volume.

Figure 1:
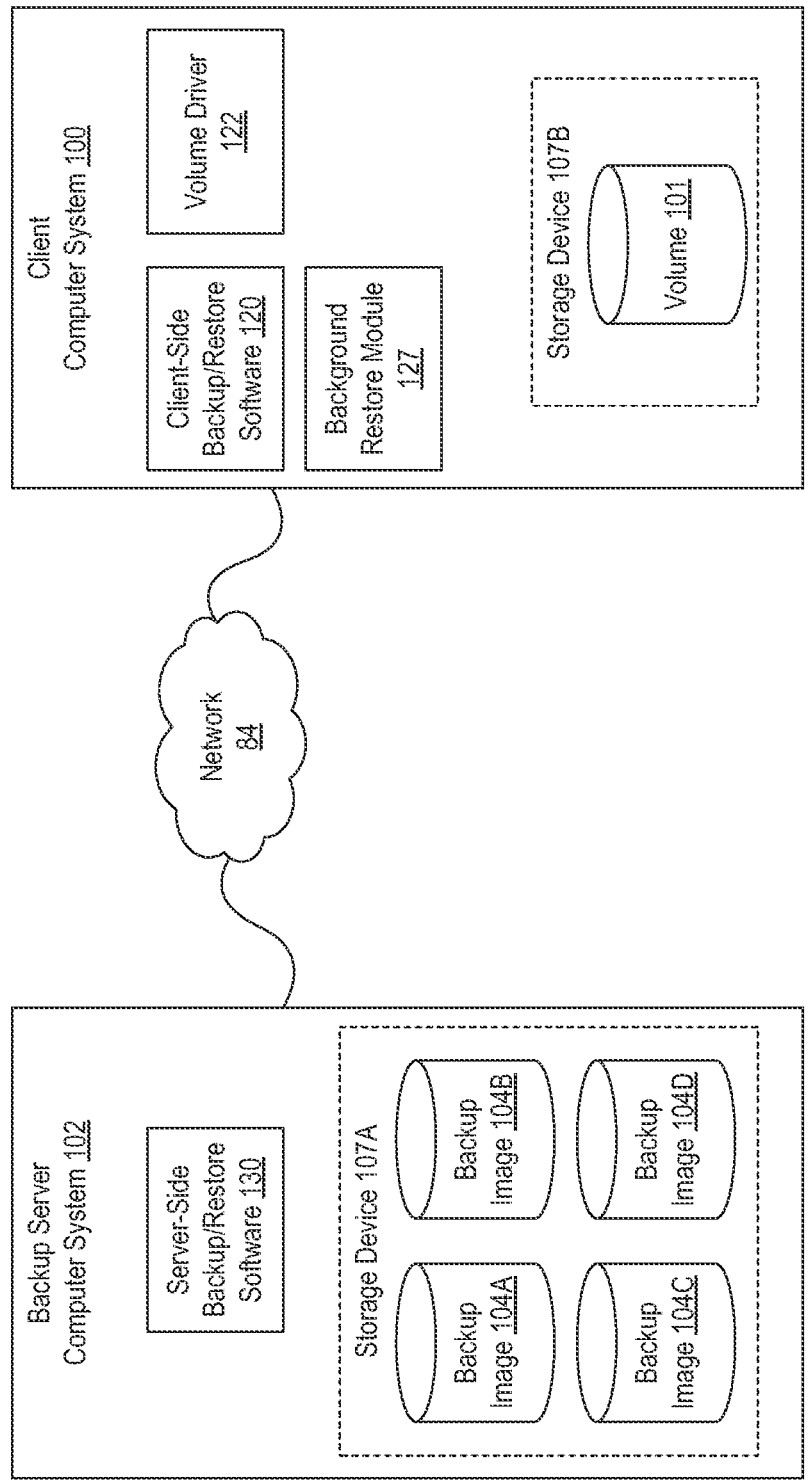
FIG. 1 illustrates one embodiment of a system for restoring a data volume from a backup image, where the system includes a client computer system and a backup server computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Various embodiments of a system and method for restoring a data volume from a backup image are described herein. FIG. 1 illustrates one embodiment of the system. In the illustrated embodiment the system includes a client computer system 100 and a backup server computer system 102. The client computer system 100 may be coupled to the backup server computer system 102 via a network 84. The network 84 may include any type of network or combination of networks. For example, the network may include any type or combination of local area network (LAN), a wide area network (WAN), wireless networks, an Intranet, the Internet, etc. Examples of local area networks include Ethernet networks, Fiber Distributed Data Interface (FDDI) networks, and token ring networks. The computer systems may each be coupled to the network(s) using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

The client computer system 100 may host a volume 101 that is stored on one or more storage devices 107B. As used herein, the term "volume" refers to a set of files that are organized into one or more folders or directories. The volume 101 may be stored on a single storage device 107B or may be distributed across multiple storage devices.

The client computer system 100 may execute a volume driver 122, which is software that controls read and write access to the volume 101. For example, when a complete copy of the data of the volume 101 is present at the client computer system 100 and the volume is mounted normally, the volume driver 122 may receive read requests directed to the volume 101 from various software applications executing on the client computer system 100 and may retrieve the requested data from the volume 101 in response to the read requests. During normal operation the volume driver 122 may also receive write requests directed to the volume 101 from software applications and may write the specified data to the volume 101.

As described in detail below, in non-normal operation (e.g., during a volume recovery after the volume 101 fails), the volume driver 122 may operate differently, e.g., by retrieving requested data from a data source other than the volume 101 itself in response to read operations directed to the volume 101.

The client computer system 100 may also execute client-side backup/restore software 120 that communicates over the network 84 with server-side backup/restore software 130 executing on the backup server computer system 102. The client-side backup/restore software 120 and the server-side backup/restore software 130 may be configured to communicate to periodically backup the volume 101 to the backup server computer system 102. Each time the volume 101 is backed up, data from the volume may be stored on a storage device 107A at the backup server computer system 102 in a respective backup image 104 that reflects the state of the volume data at the time the backup operation is performed. As used herein, the term "backup image" refers to a data set created from a data source (e.g., the volume 101), where the data set includes a copy of at least some of the data in the data source.

The backup images 104 created on the backup server computer system 102 may be either full backup images or incremental backup images of the volume 101. A full backup image may include a complete copy of the volume 101 as it exists at the time the full backup image is created. For example, a full backup image may include all of the data of all of the files in the volume 101. Thus, a full backup image may be an independent backup image that does not depend on any other backup image. An incremental backup image is a backup image that depends on, or is relative to, another backup image, e.g., an incremental backup image that represents the volume data that has changed since a previous backup image was created. An incremental backup image may depend on a full backup image (e.g., may represent the volume data changes that have occurred since the full backup image was created) or may depend on a previous incremental backup image (e.g., may represent the volume data changes that have occurred since the previous incremental backup image was created). An incremental backup image may include the volume data that has changed since the time when the (full or incremental) backup image on which it depends was created, and may not include volume data that has not changed since the time when the backup image on which it depends was created.

In the example of FIG. 1, four backup images 104A-104D have been created from the volume 101 and stored on the backup server computer system 102. In various embodiments any number of backup images 104 may be stored on the backup server computer system 102. For example, the backup software may be configured with a backup policy specifying that backup images should be periodically created from the volume 101 and stored on the backup server computer system 102. As one example, the backup policy may specify that a full backup image should be created once a week, with incremental backup images being created at the end of each day, or another desired time schedule.

In other embodiments, instead of creating the backup images 104 periodically, the volume 101 may be continuously backed up to a backup image 104 on the backup server computer system 102, e.g., according to a continuous data protection (CDP) model. For example, each time the volume driver 122 receives a new write request directed to the volume 101, the volume driver 122 may write the specified data to the volume 101, and in addition may also transmit the specified data to the backup server computer system 102 where it is used to update the backup image 104 in real time to reflect the new data.

At a subsequent time after the backup images 104 have been created on the backup server computer system 102, the volume 101 may need to be restored from one of the backup images 104. For example, the storage device 107B at the client computer system 100 could fail and cause the volume 101 to be lost, or the volume 101 could become corrupted so that the volume 101 is no longer useable or contains errors.

The client-side backup/restore software 120 may provide a graphical user interface enabling a user of the client computer system 100 to request the volume 101 to be restored. For example, the client-side backup/restore software 120 may communicate with the server-side backup/restore software 130 to receive a list of all the backup images 104 stored at the backup server computer system 102 that the user can choose from, such as the backup images 104 that were previously created from the volume 101. After determining which backup images 104 are available at the backup server computer system 102 for the user to choose from, the client-side backup/restore software 120 may display them in the graphical user interface and allow the user to select one to use as the data source for restoring the volume 101 to the client computer system 100. In some embodiments the graphical user interface may display the date when each available backup image 104 was created, as well as possibly providing the user with a default option to select the most recent backup image 104 created from the volume 101. The user may interact with the graphical user interface to select which backup image 104 he wants to use as the data source for restoring the volume 101.

One conventional approach to restore the volume 101 would be to transfer the entire backup image 104 selected by the user over the network 84 from the backup server computer system 102 back to the original client computer system 100, and then re-create the volume 101 from the backup image. However, the data transfer may be time consuming if there is a large amount of data in the backup image, and the user may need to wait while the data is transferred before the volume 101 can be accessed again.

In recognition of this problem, embodiments of the system and method may enable the volume 101 to be restored on the client computer system 100 without first requiring all of the data in the selected backup image 104 to be transmitted from the backup server computer system 102 to the client computer system 100. Instead, a lazy restore technique may be used where volume data is retrieved from the backup image 104 on the backup server computer system 102 as needed instead of transferring the entire backup image 104 to the client computer system 100 at once.

In response to the user selecting the desired backup image 104 to use to restore the volume 101, the client-side backup/restore software 120 may cause the volume 101 to immediately become mounted on the client computer system 100 so that it appears to other applications that the volume 101 is present on the client computer system 100 as a normal volume, even though none of the data of the volume 101 is actually present yet at the client computer system 100. The client-side backup/restore software 120 may also configure the volume driver 122 to cause the volume driver 122 to re-direct read requests for the volume 101 to the backup server computer system 102. Once the volume 101 is mounted, the user may immediately be able to browse and open folders in the volume 101 to see the files in the volume 101, and software applications may read and write to the files just as they would (from their perspective) to files in any other volume 101.

The volume driver 122 may receive each read request directed to the volume 101 by the file system or by an application, and may first check whether the data blocks requested by the read request are present in the volume 101. Any requested data blocks that are not yet present locally in the volume 101 may be requested from the backup server computer system 102. For example, the volume driver 122 may communicate with a data retrieval module of the server-side backup/restore software 130 and specify the data blocks that are needed and which backup image 104 to read them from. The server-side backup/restore software 130 may read the specified data blocks from the backup image 104 and transmit them over the network 84 to the volume driver 122. The volume driver 122 may receive the data blocks and return them to the application that requested them. The volume driver 122 may also store the data blocks in the volume 101. The volume driver 122 may also maintain metadata indicating which data blocks are present locally in the volume 101, and may thus update the metadata as well when new data blocks are stored in the volume 101.

If the volume driver 122 receives a read request requesting data blocks that have already been retrieved from the backup server computer system 102 and stored in the volume 101, the volume driver 122 may read these data blocks from the local volume 101 without retrieving them from the backup server computer system 102 again. Thus, the first time a particular data block is requested by a read request, the data block may be retrieved over the network 84 from the backup server computer system 102, and the data block may then be retrieved from the volume 101 on the client computer system 100 in response to any subsequent read requests requesting the same data block. In this way, the volume 101 may start out empty, and the volume data may gradually be restored to the volume 101 over time as more and more of the data blocks are requested.

Since the data blocks of the volume 101 are retrieved from the remote backup server computer system 102 on an as-needed basis, software applications can begin to use the volume 101 again almost immediately without having to first wait for the entire set of data blocks to be restored from the backup server computer system 102 to the local client computer system 100. This feature may be referred to as "instant volume restore" since the volume can effectively be restored and used instantly (or almost instantly, with only a small amount of time needed to configure the volume driver 122 to begin retrieving the volume data from the backup image 104 on the remote backup server computer system 102). Since the backup image 104 may be stored remotely on the backup server computer system 102 without the user of the client computer system 100 knowing where exactly the backup image 104 is located, it is common to refer to it as being stored "in the cloud", and thus the instant volume restore may also be referred to as a "cloud-based instant volume restore".

In further embodiments, in addition to the volume driver 122 retrieving from the backup server computer system 102 the particular data blocks that are specifically requested by applications executing on the client computer system 100, other data blocks that have not been specifically requested may also be restored to the volume 101 in the background. For example, the client computer system 100 may be configured to execute a background restore module 127 that executes when the client computer system 100 is not busy performing other input/output or processing tasks, and/or when extra network bandwidth is available to the client computer system 100. The background restore module 127 may communicate with the backup server computer system 102 to retrieve data blocks from the backup image 104 that have not yet been requested or retrieved by the volume driver 122. This may continue until all of the data blocks of the volume 101 have been restored to the client computer system 100. The background restore module 127 may give precedence to the volume driver 122 to enable it to quickly retrieve the particular volume data blocks that are specifically requested by other applications executing on the client computer system 100 so that the background retrieval of the unrequested data blocks does not interfere with or delay the retrieval of the specifically requested data blocks.

The volume driver 122 may also handle write requests directed to the volume 101. Each write request may specify one or more data blocks to be written to the volume. The volume driver 122 may write the specified data blocks to the volume 101 and update the metadata to indicate that these data blocks are now present in the volume 101. If a subsequent read request requests these data blocks, they may be read from the volume 101.

Although the cloud-based instant volume restore method discussed above may enable applications to immediately begin using a failed volume 101 again, there may still be some delay involved in retrieving the volume data blocks requested by the applications from the remote backup server computer system, e.g., due to network latency. Also, the retrieval of the volume data blocks over the network 84 may reduce the amount of network bandwidth available to other applications, and may require the client computer system 100 to remain connected to the backup server computer system 102 for a significant amount of time if there is a large amount of volume data. In recognition of these problems, further embodiments of the system and method may enable the data source for the volume 101 to be switched from the remote backup server computer system 102 to a local data source at a later time. For example, when the volume 101 on the client computer system 100 fails, the user may contact an administrator or organization who manages the backup server computer system 102 and may order a copy of the desired backup image 104 to use to restore the volume 101. In some embodiments the client-side backup/restore software 120 may be configured to display a graphical user interface that enables the user to place an order to receive a portable storage device storing a copy of the backup image 104. In response to user input to the graphical user interface, the client-side backup/restore software 120 may communicate with an e-commerce system of a vendor or service provider who manages the backup server computer system 102 to electronically place the order. The vendor or service provider may then ship the user a portable storage device (e.g., a USB hard drive for example) on which a copy of the backup image 104 is stored.

Figure 2:
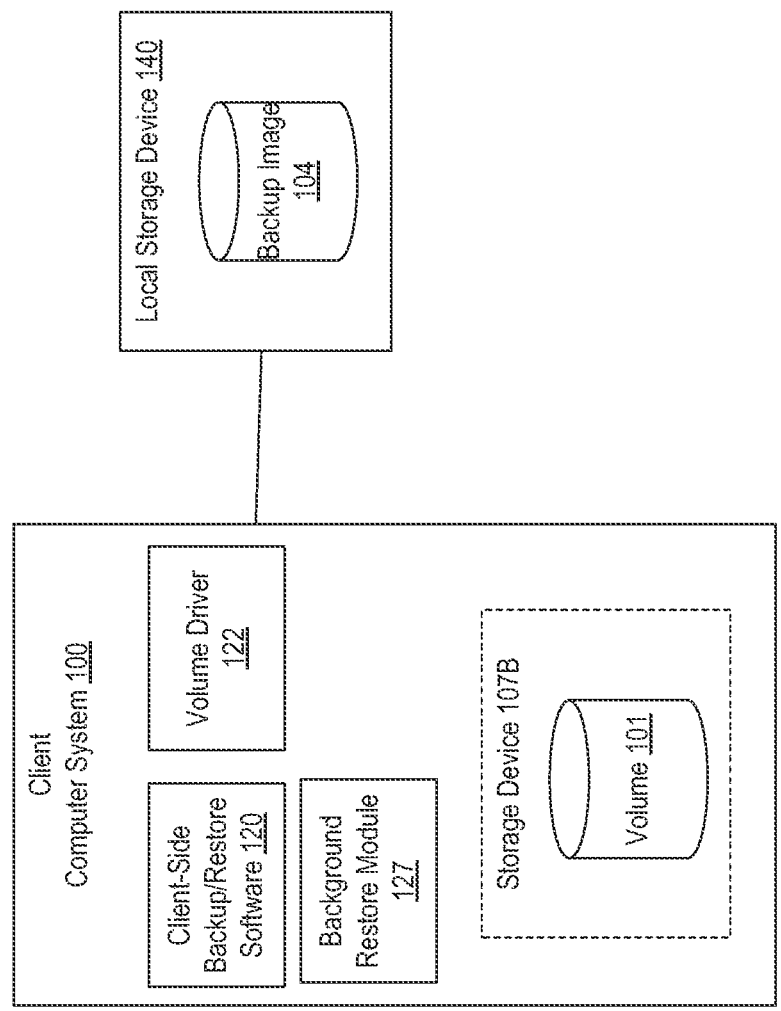
FIG. 2 illustrates the system after a local storage device storing a copy of the backup image has been connected to the client computer system.

In the meantime, while the user is waiting for the portable storage device to arrive, the volume driver 122 may be configured to use the remote copy of the backup image stored at the remote backup server computer system 102 as the data source for the volume 101, as described above. Once the portable storage device arrives to the user, the user may connect the portable storage device to the client computer system 100 so that it is available on the client computer system 100 as a local storage device 140, as illustrated in FIG. 2. The user may then interact with a graphical user interface of the client-side backup/restore software 120 to switch to the copy of the backup image 104 stored on the local storage device 140 as the data source for the volume 101. In response, the client-side backup/restore software 120 may configure the volume driver 122 to begin directing read requests for the volume 101 to the local copy of the backup image 104 stored on the local storage device 140 instead of to the remote copy of the backup image 104 stored on the remote backup server computer system 102. The volume driver 122 may handle the read requests similarly as described above, e.g., by retrieving requested data blocks from the volume 101 itself if they are present in the volume 101, or by else by retrieving them from the copy of the backup image stored on the local storage device 140 and storing them in the volume 101 so that they will be available there in the future. Write requests may also be handled similarly as described above, e.g., by writing the specified data blocks to the volume 101 and updating the metadata to indicate that these data blocks are now present in the volume 101.

After the volume data source has been switched to the local copy of the backup image 104 stored on the local storage device 140, the background restore module 127 may operate in the background to retrieve data blocks that have not yet been requested from the local copy of the backup image 140 and store them in the volume 101.

Thus, the remote copy of the backup image 104 stored on the remote backup server computer system 102 may first be used as the data source for the volume 101 so that the user and the applications on the client computer system 100 can immediately begin using the volume 101 again. The data source for the volume 101 may then be switched to the local copy of the backup image 104 stored on the local storage device 140 once the user receives it and connects it to the client computer system 100. This may enable the remainder of the data blocks to be retrieved from the local storage device 140 and added to the volume 101 without requiring them to be transferred to the client computer system 100 from the backup server computer system 102 over the network 84. This may reduce the amount of network bandwidth used for the volume restoration, as well as enabling the remaining data blocks to be restored to the volume 101 more quickly since they can likely be transferred to the volume 101 more quickly from the local storage device 140. Switching the volume data source to the local storage device may also enable the client-side backup/restore software 120 and volume driver 122 to disconnect from the backup server computer system.

Throughout the restoration process, the volume 101 may remain mounted on the client computer system 100 and available for use by software applications. The retrieval of the volume data blocks from the external data source (e.g., from the copy of the backup image 104 on the backup server computer system 102 or from the copy of the backup image 104 on the local storage device 140) may be handled by the volume driver 122 and/or the client-side backup/restore software 120 without the other software applications being aware that the volume 101 is any different than a normal volume. Also, when the data source for the volume is switched from the copy of the backup image 104 on the backup server computer system 102 to the copy of the backup image 104 on the local storage device 140, the switchover may happen invisibly to other applications, e.g., so that the volume continues to be mounted and available for the applications to read from and write to.

In some embodiments the client-side backup/restore software 120 may enable the user to select different kinds of restore operations. For example, the user may be able to select a lazy restore operation which operates to retrieve the volume data blocks that are specifically requested by other applications from a data source external to the volume on an as-needed basis as described above. The user may also be able to turn on or off the background restore operation that retrieves unrequested data blocks from the external data source in the background, e.g., in a low priority thread or task. The user may also be able to select a full restore operation which operates similarly to the background restore option by copying in the data blocks that are not present yet in the volume 101 from the external data source, but which operates in a high priority thread or task so that the volume restoration process is completed as quickly as possible. The user may also be able to switch back and forth between different restore modes.

It is noted that embodiments of the method may also be used to instantly restore a volume 101 to a computer system other than the original client computer system 100 from which the volume 101 was created. The target computer system may execute the client-side backup/restore software 120, with which the user may interact to select a desired backup image to use as a source for a new volume on the target computer system. The client-side backup/restore software 120 may then use the instant restore method to instantly create the volume on the target computer system using the selected backup image as the volume data source.

Figure 3:
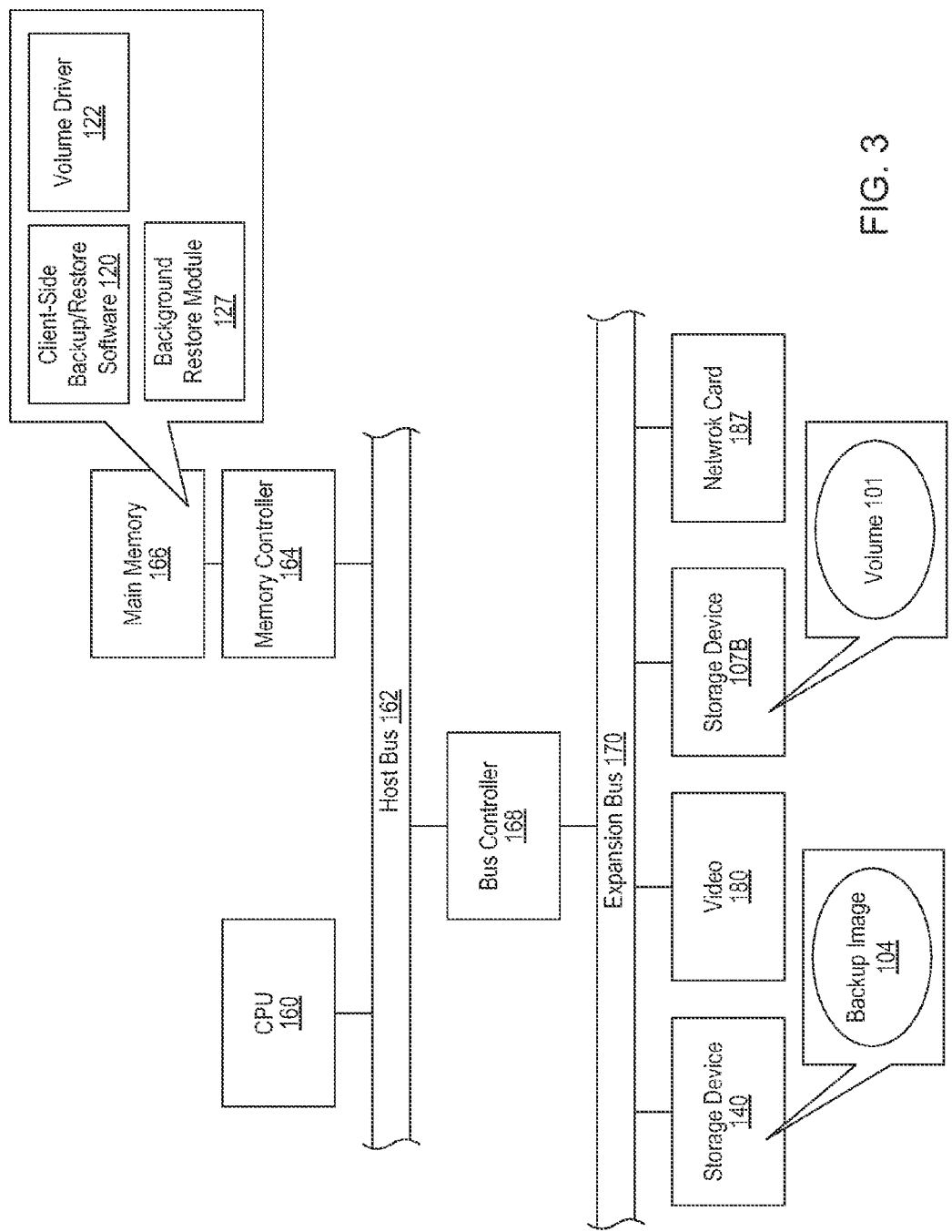
FIG. 3 illustrates one embodiment of the client computer system in more detail.

In various embodiments, the client computer system 100 and the backup server computer system 102 may each be any kind of computer system, such as a personal computer system (PC), workstation, network appliance, distributed computer system, handheld device, or other computing device or combinations of devices. In general, the term "computer system" can be defined to encompass any device (or combination of devices) having at least one processor that executes instructions from one or more storage mediums. FIG. 3 illustrates one embodiment of the client computer system 100 in more detail. The client computer system 100 may have any configuration or architecture, and FIG. 2 illustrates a representative PC embodiment. Elements of a computer not necessary to understand the present description have been omitted for simplicity.

The client computer system 100 may include at least one central processing unit or CPU (processor) 160 which is coupled to a processor or host bus 162. The CPU 160 may be any of various types. For example, in some embodiments, the processor 160 may be compatible with the x86 architecture, while in other embodiments the processor 160 may be compatible with the SPARC™ family of processors. Also, in some embodiments the client computer system 100 may include multiple processors 160.

The client computer system 100 may also include memory 166 in which program instructions implementing the client-side backup/restore software 120, the volume driver 122, and the background restore module 127 are stored. In some embodiments the memory 166 may include one or more forms of random access memory (RAM) such as dynamic RAM (DRAM) or synchronous DRAM (SDRAM). In other embodiments, the memory 166 may include any other type of memory configured to store program instructions. The memory 166 may also store operating system software or other software used to control the operation of the client computer system 100. The memory controller 164 may be configured to control the memory 166.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. Various devices may be coupled to the expansion or input/output bus 170, such as a video display subsystem 180 which sends video signals to a display device, and a network card or device 187 that enables the client computer system 100 to send and receive information over the network 84.

The volume 101 may be stored on a storage device 107B which is included in or coupled to the client computer system 100. In some embodiments the storage device 107B may be a hard disk drive 182 or other storage device that stores information in a non-volatile manner. FIG. 2 also illustrates the local storage device 140 after the user has received it and connected it to the client computer system 100. As discussed above, the storage device 140 may store a copy of the backup image 104 that the user selects as the source for the volume 101. In various embodiments the storage device 140 may be any kind of storage device or may include any kind of storage media, such as a disk drive, tape drive, optical disk, flash memory, etc. The storage device 140 may be a portable storage device with a small form factor that can be easily shipped to the user. The storage device 140 may be connected to the client computer system 100 in various ways, such as through a universal serial bus (USB) port or other type of bus or communication port. As used herein, the term "local storage device" means that the storage device is local to a particular computer system to which the storage device is connected so that the computer system can communicate with the storage device without communicating over a wide area network (WAN) or the Internet. In some embodiments, the local storage device may be coupled to the computer system through another type of network other than a WAN or the Internet, such as a through a local area network (LAN). In other embodiments the local storage device may be directly connected to the computer system through one or more cables (e.g., a USB cable) without using a network, in which case the local storage device is referred to herein as a "non-network local storage device".

Figure 4:
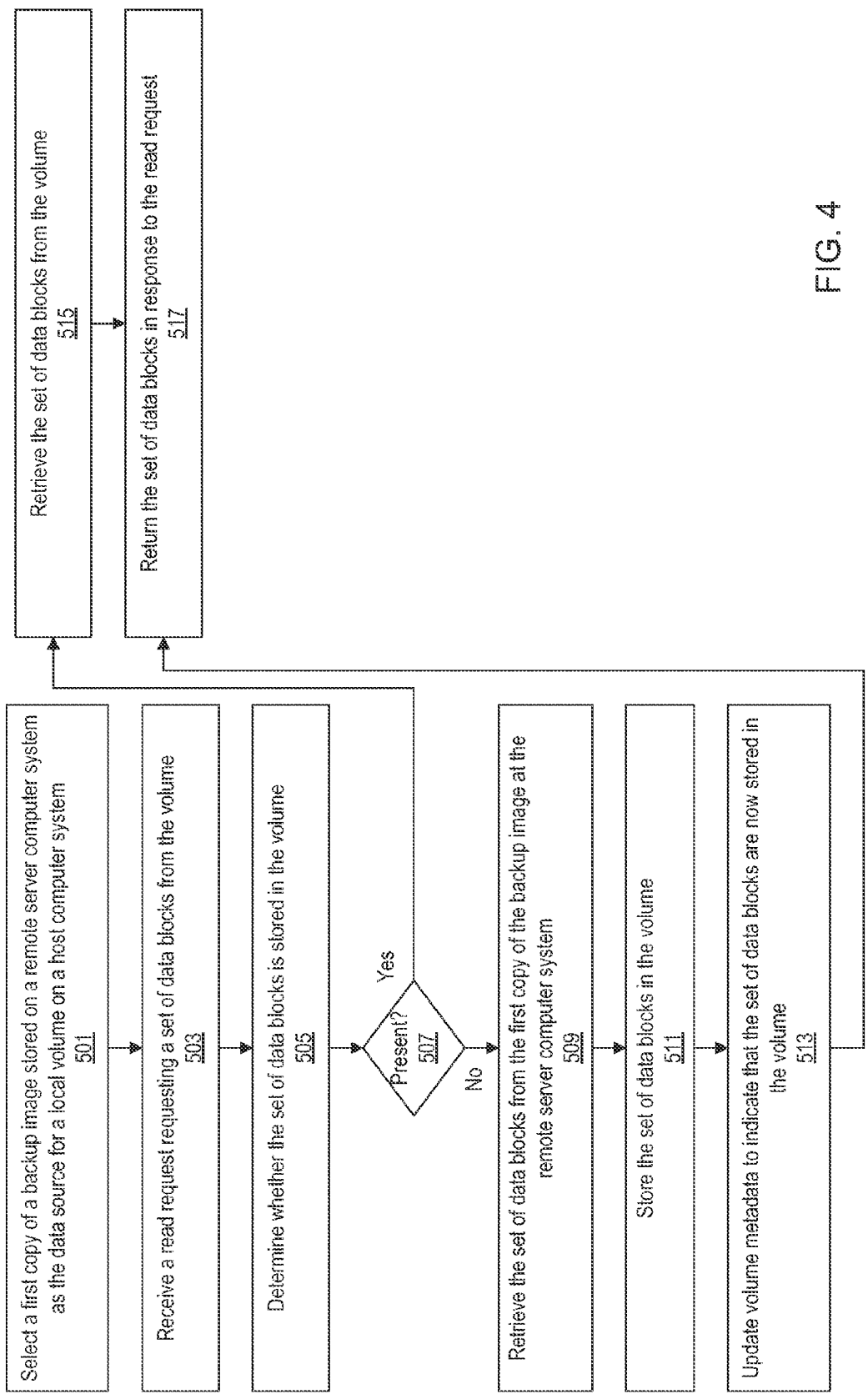
FIG. 4 is a flowchart diagram illustrating one embodiment of a method for instantly restoring a volume to the client computer system from a first copy of the backup image stored on the backup server computer system.

FIG. 4 is a flowchart diagram illustrating one embodiment of a method for instantly restoring a volume to a host computer system (e.g., to the client computer system 100) from a first copy of a backup image stored on a remote server computer system. The method may be implemented by software executing on the host computer system, such as the client-side backup/restore software 120 and the volume driver 122 in some embodiments.

In block 501, the client-side backup/restore software 120 may select the first copy of the backup image stored on the remote server computer system as the data source for a local volume on the host computer system. In response, the client-side backup/restore software 120 may configure the volume driver 122 to begin directing read requests for the volume to the first copy of the backup image. The first copy of the backup image may be selected as the data source for the volume in order to restore the volume in response to detecting a failure of the volume.

In block 503 the volume driver 122 may receive a read request requesting a set of data blocks from the volume. For example, the read request may originate from another application on the host computer system or from the file system of the host computer system. In block 505 the volume driver 122 may determine whether the set of data blocks is already stored in the volume. As indicated in blocks 507 and 509, if the set of data blocks is not present in the volume then the volume driver 122 may retrieve the set of data blocks from the first copy of the backup image at the remote server computer system. The volume driver may also store the set of data blocks in the volume and update volume metadata to indicate that the set of data blocks are now stored in the volume, as shown in blocks 511 and 513.

Otherwise, as indicated in blocks 507 and 515, if the set of data blocks is already present in the volume then the volume driver 122 may retrieve the set of data blocks from the volume.

In block 517 the volume driver may return the set of data blocks in response to the read request.

Figure 5:
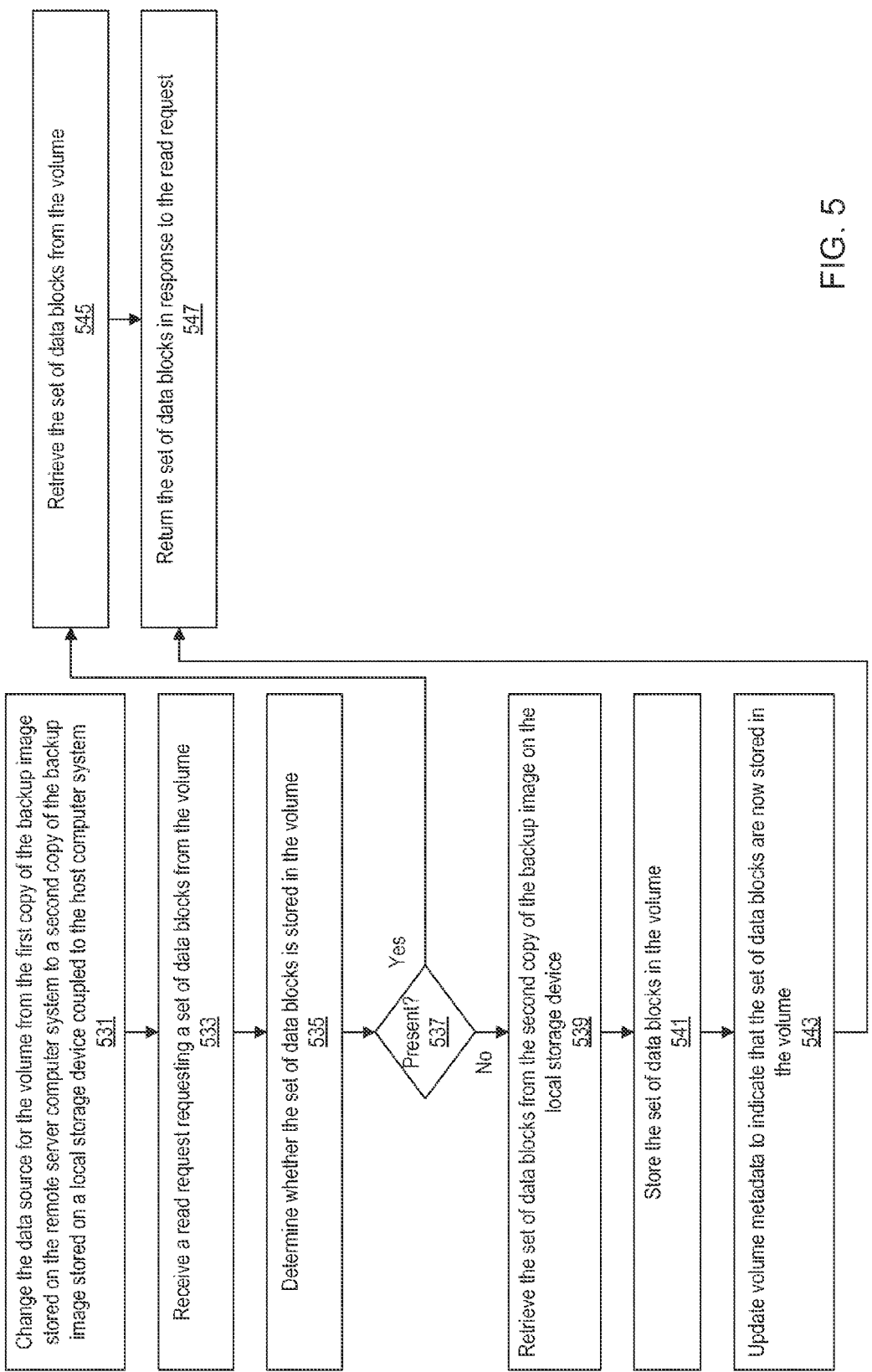
FIG. 5 is a flowchart diagram illustrating one embodiment of a method for changing the data source for the volume, e.g., after the user has received a portable storage device that stores a second copy of the backup image and connected it to the client computer system as a local storage device.

FIG. 5 is a flowchart diagram illustrating one embodiment of a method changing the data source for the volume, e.g., after the user has received a portable storage device that stores a second copy of the backup image and connected it to the host computer system as a local storage device. Again, the method may be implemented by software executing on the host computer system, such as the client-side backup/restore software 120 and the volume driver 122.

In block 531 the client-side backup/restore software 120 may change the data source for the volume from the first copy of the backup image stored on the remote server computer system to the second copy of the backup image stored on the local storage device. In response, the client-side backup/restore software 120 may configure the volume driver 122 to begin directing read requests for the volume to the second copy of the backup image instead of to the first copy of the backup image. The client-side backup/restore software 120 may display a graphical user interface enabling the user to change the data source for the volume to the second copy of the backup image. In some embodiments the volume may remain mounted on the host computer while the data source for the volume is changed to the second copy of the backup image.

In block 533 the volume driver 122 may receive a read request requesting a set of data blocks from the volume. In block 535 the volume driver 122 may determine whether the set of data blocks is already stored in the volume. As indicated in blocks 537 and 539, if the set of data blocks is not present in the volume then the volume driver 122 may retrieve the set of data blocks from the second copy of the backup image on the local storage device. The volume driver may also store the set of data blocks in the volume and update volume metadata to indicate that the set of data blocks are now stored in the volume, as shown in blocks 541 and 543.

Otherwise, as indicated in blocks 537 and 545, if the set of data blocks is already present in the volume then the volume driver 122 may retrieve the set of data blocks from the volume. For example, the set of data blocks may have previously been retrieved from the first copy of the backup image and stored in the volume in response to a read request that was received when the first copy of the backup image was still selected as the data source for the volume. As another example, the set of data blocks may have previously been retrieved from the second copy of the backup image and stored in the volume in response to a read request that was received after the data source for the volume had already been changed to the second copy of the backup image. As another example, one subset of the set of data blocks may have previously been retrieved from the first copy of the backup image and stored in the volume in response to one read request, and another subset of the set of data blocks may have previously been retrieved from the second copy of the backup image and stored in the volume in response to another read request.

In block 547 the volume driver may return the set of data blocks in response to the read request.

In the flowchart examples, it is assumed that either the entire set of data blocks requested by a read request is present in the volume, or none of them are present. In other embodiments, one subset of the set of data blocks requested by a read request may be present in the volume, and another subset may not be present. For example, a third read request requesting a set of data blocks from the local volume may be received, where the set of data blocks includes a first subset of data blocks that were previously requested by a previous read request and a second subset of data blocks that have not yet been requested by any read request. In this example, the first subset of data blocks may be retrieved from the volume in response to the read request, and the second subset of data blocks may be retrieved from the volume's data source (either from the first copy of the backup image or the second copy of the backup image, depending on which data source the volume is set to at the time).

In further embodiments, while the first copy of the backup image is selected as the data source for the volume, the client-side backup/restore software 120 may initiate a background restore operation to retrieve data blocks that have not yet been requested by any read requests from the first copy of the backup image at the remote server computer system and store them in the local volume. The client-side backup/restore software 120 may then halt the background restore operation before it has completed. After the data source for the local volume has been changed to the second copy of the backup image, the client-side backup/restore software 120 may resume the background restore operation to continue retrieving data blocks that have not yet been requested by any read requests from the second copy of the backup image on the local storage device and store them in the local volume. The resumed background restore operation may continue where the previous background restore operation left off, e.g., so that data blocks that were already retrieved by the previous background restore operation remain in the volume and do not need to be re-stored in the volume.

Figure 6:
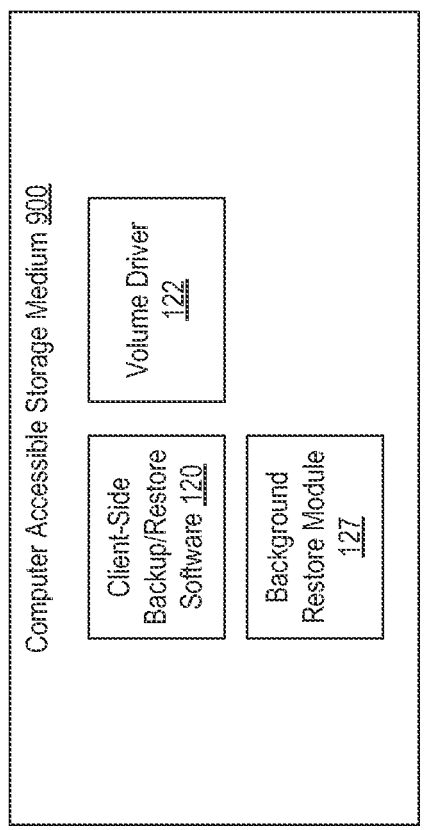
FIG. 6 is a block diagram of a computer accessible storage medium.

Turning now to FIG. 6, a block diagram of a computer accessible storage medium 900 is shown. The computer accessible storage medium 900 may store program instructions executable by one or more processors to implement various functions described above, such as program instructions associated with the client-side backup/restore software 120, the volume driver 122, and/or the background restore module 127. Generally, the computer accessible storage medium 900 may store any set of instructions which, when executed, implement a portion or all of the functions described above for restoring a volume.

Generally speaking, a computer accessible storage medium may include any storage media accessible by one or more computers during use to provide instructions and/or data to the computer(s). For example, a computer accessible storage medium may include storage media such as magnetic or optical media, e.g., one or more disks (fixed or removable), tapes, CD-ROMs, DVD-ROMs, CD-Rs, CD-RWs, DVD-Rs, DVD-RWs, or Blu-Ray disks. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A non-transitory, computer-accessible storage medium storing program instructions executable by one or more processors to:
   - select a first copy of a backup image stored on a remote server as a data source for a volume on a host computer system;
   - after selecting the first copy of the backup image as the data source for the volume, receive a first read request requesting a first set of data blocks from the volume;
   - in response to determining that the first set of data blocks is not stored in the volume, retrieve the first set of data blocks from the first copy of the backup image at the remote server, and store the first set of data blocks in the volume;
   - while the first copy of the backup image is selected as the data source for the volume, initiate a restore operation to retrieve data blocks that have not yet been requested by a read request from the first copy of the backup image at the remote server and store them in the volume;
   - halt the restore operation;
   - after retrieving the first set of data blocks, change the data source for the volume from the first copy of the backup image at the remote server to a second copy of the backup image stored on a local storage device coupled to the host computer system;
   - after the data source for the volume has been changed to the second copy of the backup image, resume the restore operation to continue retrieving data blocks that have not yet been requested by a read request from the second copy of the backup image on the local storage device and store them in the volume;
   - after the data source for the volume has been changed to the second copy of the backup image, receive a second read request requesting a second set of data blocks from the volume; and
   - in response to determining that the second set of data blocks is not stored in the volume, retrieve the second set of data blocks from the second copy of the backup image on the local storage device, and store the second set of data blocks in the volume.

2. The non-transitory, computer-accessible storage medium of claim 1,
   - wherein the program instructions are executable by the one or more processors to select the first copy of the backup image as the data source for the volume in response to detecting a failure of the volume.

3. The non-transitory, computer-accessible storage medium of claim 1, wherein the program instructions are further executable by the one or more processors to:
   - place an order for the local storage device on which the second copy of the backup image is stored with a vendor who manages the remote server.

4. The non-transitory, computer-accessible storage medium of claim 1, wherein the program instructions are further executable by the one or more processors to:
   - return the first set of data blocks in response to the first read request; and
   - return the second set of data blocks in response to the second read request.

5. The non-transitory, computer-accessible storage medium of claim 1,
wherein the second read request also requests a third set of data blocks from the volume;
wherein the program instructions are further executable by the one or more processors to retrieve the third set of data blocks from the volume in response to determining that the third set of data blocks is already stored in the volume.

6. The non-transitory, computer-accessible storage medium of claim 5,
wherein the third set of data blocks were previously retrieved from the first copy of the backup image at the remote server while the first copy of the backup image was selected as the data source for the volume.

7. The non-transitory, computer-accessible storage medium of claim 5,
wherein the third set of data blocks were previously retrieved from the second copy of the backup image on the local storage device while the second copy of the backup image was selected as the data source for the volume.

8. The non-transitory, computer-accessible storage medium of claim 5,
wherein the third set of data blocks includes a first one or more data blocks that were previously retrieved from the first copy of the backup image at the remote server while the first copy of the backup image was selected as the data source for the volume, and a second one or more data blocks that were previously retrieved from the second copy of the backup image on the local storage device while the second copy of the backup image was selected as the data source for the volume.

9. The non-transitory, computer-accessible storage medium of claim 1, wherein the program instructions are further executable by the one or more processors to:
after receiving the first read request and before changing the data source for the volume to the second copy of the backup image, receive a third read request requesting one or more data blocks from the volume, wherein the one or more data blocks includes one or more of the first set of data blocks requested by the first read request and one or more additional data blocks;
retrieve the one or more of the first set of data blocks from the volume in response to the third read request; and
in response to determining that the one or more additional data blocks are not stored in the volume, retrieve the one or more additional data blocks from the first copy of the backup image at the remote server, and store the one or more additional data blocks in the volume.

10. The non-transitory, computer-accessible storage medium of claim 1,
wherein the program instructions are executable by the one or more processors to change the data source for the volume to the second copy of the backup image while the volume remains mounted on the host computer system.

11. The non-transitory, computer-accessible storage medium of claim 1, wherein the program instructions are executable by the one or more processors to:
begin performing the restore operation before the first read request is received; and
pause the restore operation in response to receiving the first read request.

12. The non-transitory, computer-accessible storage medium of claim 1, wherein the program instructions are further executable by the one or more processors to:
display a graphical user interface enabling a user to select the data source for the volume;
perform said changing the data source for the volume from the first copy of the backup image to the second copy of the backup image in response to user input selecting the data source.

13. A host computer system comprising:
one or more processors; and
memory storing program instructions, wherein the program instructions are executable by the one or more processors to:
select a first copy of a backup image stored on a remote server as a data source for a volume on the host computer system;
after selecting the first copy of the backup image as the data source for the volume, receive a first read request requesting a first set of data blocks from the volume;
in response to determining that the first set of data blocks is not stored in the volume, retrieve the first set of data blocks from the first copy of the backup image at the remote server, and store the first set of data blocks in the volume;
while the first copy of the backup image is selected as the data source for the volume, initiate a restore operation to retrieve data blocks that have not yet been requested by a read request from the first copy of the backup image at the remote server and store them in the volume;
halt the restore operation;
after retrieving the first set of data blocks, change the data source for the volume from the first copy of the backup image at the remote server to a second copy of the backup image stored on a local storage device coupled to the host computer system;
after the data source for the volume has been changed to the second copy of the backup image, resume the restore operation to continue retrieving data blocks that have not yet been requested by a read request from the second copy of the backup image on the local storage device and store them in the volume;
after the data source for the volume has been changed to the second copy of the backup image, receive a second read request requesting a second set of data blocks from the volume; and
in response to determining that the second set of data blocks is not stored in the volume, retrieve the second set of data blocks from the second copy of the backup image on the local storage device, and store the second set of data blocks in the volume.

14. A method comprising:
executing software on a computer system, wherein executing the software includes the software performing the following:
selecting a first copy of a backup image stored on a remote server as a data source for a volume on a host computer system;
after selecting the first copy of the backup image as the data source for the volume, receiving a first read request requesting a first set of data blocks from the volume;
in response to determining that the first set of data blocks is not stored in the volume, retrieving the first set of data blocks from the first copy of the backup image at the remote server, and storing the first set of data blocks in the volume;
while the first copy of the backup image is selected as the data source for the volume, initiating a restore operation to retrieve data blocks that have not yet been requested by a read request from the first copy of the backup image at the remote server and store them in the volume;

halting the restore operation;

after retrieving the first set of data blocks, changing the data source for the volume from the first copy of the backup image at the remote server to a second copy of the backup image stored on a local storage device coupled to the host computer system;

after the data source for the volume has been changed to the second copy of the backup image, resuming the restore operation to continue retrieving data blocks that have not yet been requested by a read request from the second copy of the backup image on the local storage device and store them in the volume;

after the data source for the volume has been changed to the second copy of the backup image, receiving a second read request requesting a second set of data blocks from the volume; and in response to determining that the second set of data blocks is not stored in the volume, retrieving the second set of data blocks from the second copy of the backup image on the local storage device, and storing the second set of data blocks in the volume.

\* \* \* \* \*